United States Patent
Laborda Rubio et al.

(10) Patent No.: US 11,598,313 B2
(45) Date of Patent: Mar. 7, 2023

(54) WIND TURBINE CONTROL METHOD

(71) Applicant: NORDEX ENERGY SPAIN, S.A., Navarra (ES)

(72) Inventors: Jose Luis Laborda Rubio, Navarra (ES); Alberto Garcia Barace, Navarra (ES); Teresa Arlaban Gabeiras, Navarra (ES); Jose Luis Aristegui Lantero, Navarra (ES); Alejandro Gonzalez Murua, Navarra (ES); Jose Miguel Garcia Sayes, Navarra (ES); Miguel Nunez Polo, Navarra (ES)

(73) Assignee: NORDEX ENERGY SPAIN, S.A., Barasoain (ES)

( * ) Notice: Subject to any disclaimer, the term of this patent is extended or adjusted under 35 U.S.C. 154(b) by 1613 days.

(21) Appl. No.: 14/580,948

(22) Filed: Dec. 23, 2014

(65) Prior Publication Data
US 2015/0176568 A1    Jun. 25, 2015

(30) Foreign Application Priority Data
Dec. 23, 2013 (ES) ................ ES201331903

(51) Int. Cl.
*F03D 7/04* (2006.01)
*F03D 7/02* (2006.01)

(52) U.S. Cl.
CPC .......... *F03D 7/044* (2013.01); *F03D 7/0204* (2013.01); *F03D 7/0224* (2013.01); *F05B 2270/32* (2013.01); *F05B 2270/329* (2013.01); *Y02E 10/72* (2013.01); *Y02P 70/50* (2015.11)

(58) Field of Classification Search
CPC ...... F03D 7/044; F03D 7/0204; F03D 7/0224; F05B 2270/329; Y02P 10/273; Y02P 70/523; Y02P 10/723
USPC ............................................... 416/1
See application file for complete search history.

(56) References Cited

U.S. PATENT DOCUMENTS

| | | | | |
|---|---|---|---|---|
| 4,656,362 A | * | 4/1987 | Harner ........... | F03D 7/0224 290/44 |
| 8,096,761 B2 | * | 1/2012 | Fric ............... | F03D 7/0224 416/1 |
| 2009/0246019 A1 | * | 10/2009 | Volanthen ...... | F03D 80/40 416/1 |
| 2010/0014969 A1 | | 1/2010 | Wilson et al. | |
| 2012/0009062 A1 | | 1/2012 | Ingram et al. | |
| 2012/0134807 A1 | | 5/2012 | Axelsson et al. | |
| 2012/0237346 A1 | * | 9/2012 | Mascarell ...... | F03D 7/0224 416/1 |

FOREIGN PATENT DOCUMENTS

WO    2015048972 A1    4/2015

* cited by examiner

*Primary Examiner* — Courtney D Heinle
*Assistant Examiner* — John S Hunter, Jr.
(74) *Attorney, Agent, or Firm* — Hayes Soloway PC

(57) ABSTRACT

A wind turbine control method involves calculating a value indicative of a misalignment φ of the wind turbine on a basis of at least one signal indicative of wind direction. A determination is made as to whether the value indicative of the misalignment φ of the wind turbine is above a first predefined misalignment threshold value. A value of a blade pitch angle β is adapted. At least one of the blades of the wind turbine is rotated about its longitudinal axis on the basis of the adapted value of the blade pitch angle β.

17 Claims, 8 Drawing Sheets

WIND TURBINE CONTROL METHOD

The present invention relates to the technical field of renewable energies, more specifically to the generation of electricity using wind power.

The object of the invention is directed at a wind turbine control method which allows efficient management of its performance in anomalous situations such as those of misalignment.

STATE OF THE ART

Nowadays the use of renewable energies for generating electricity is common, wind power being one of the most efficient among them. Wind power allows electricity to be generated on the basis of wind by means of wind turbines. Said wind turbines basically comprise a tower, a nacelle containing the electric generator, a rotor further comprising at least two blades, and a power train which transmits power from the rotor to the electric generator. The power train can comprise a gearbox which connects a low-speed shaft connected to the rotor with a high-speed shaft connected to the electric generator.

In multi-megawatt wind turbines, there is a market trend towards bigger rotors, which provide energy at a lower cost. In said configurations the control system has a growing importance. Said system maximises energy production while it limits the mechanical loads produced by the wind. To do this, the control system acts on the blade pitch angle—pitch angle—and on the torque demanded from the generator.

On the one part, the pitch angle is controlled by means of a set of actuators which make the blade rotate about its longitudinal axis. Said actuation varies the aerodynamic torque, either to obtain the maximum possible power of the wind in certain meteorological conditions, or to limit the mechanical loads produced on the wind turbine.

On the other part, the control system modulates the torque demanded to the generator from the converter. Torque modulation is also carried out with the dual objective of obtaining the maximum possible power of the wind in given meteorological conditions, and to limit the mechanical loads produced on the wind turbine.

Due to the three-dimensional and stochastic nature of wind—throughout the area swept by the rotor, wind is a non-uniform vector in space and random—the loads experienced by each blade and consequently by the wind turbine, are variable in time. One example of this variability is observed regarding height with respect to ground surface, producing the phenomenon known as wind shear. Another example is the variability in the direction of the wind, which makes it necessary to consider the actuation of a system that orients the nacelle to maintain the rotor correctly oriented. This is the yaw system.

The yaw system does not act continuously. It only orients the rotor towards the direction of the wind when a system which comprises a windvane detects that the misalignment exceeds a certain threshold value for a determined time. In the course of time during which the rotor remains disoriented, situations can arise wherein the misalignment provokes at least one blade to stall, producing high aerodynamic loads on the rotor, and losing control capacity by means of blade pitch regulation. The present invention is conceived in order to overcome this problem.

In the current state of the art, the usual is as follows:
When a misalignment is detected, the control system acts with the yaw system to correct it. However, yaw control is carried out on the basis of average misalignment signals which have to exceed a threshold for a certain time (not short) to avoid over-action of the yaw system. Furthermore, the yaw system is a slow acting system (few degrees per second), which means that, if the change in direction of the wind is large and fast, quite a long time passes before it is corrected. For example, for an error of 90° at a usual speed of the yaw orientation system of 2°/s, it would take about 45 s to orient the machine correctly. This causes the loads to increase until the alignment is corrected. This is the state of the art that is taken as the nearest state of the art to propose the invention.

The curve that defines the blade pitch angle lower limit value β min—see FIG. 1—is predetermined, i.e. for each wind speed (or power) a minimum blade pitch angle is fixed to avoid rotor over-speed.

In the speed regulation zone wherein the power generated is equal to the nominal power $P_N$, transients in the rotor speed caused by gusts of wind can lead to overspeeds (for example, after a drop in wind with an associated reduction in blade pitch angle, there can be such a sudden increase in wind where there is not enough time to increase the blade pitch angle in consequence). In this case, the wind turbine's control system causes the machine to disconnect from the power grid. To prevent said overspeeds which produce the wind turbine stoppage, there is the possibility of limiting the blade pitch angle lower limit value reached in transient events. To do this, the control system of the state of the art uses a predetermined curve that determines a minimum threshold which is applied to the blade pitch set point depending on the average blade pitch angle (the average blade pitch angle is commonly used as an indicative signal of average wind speed or power). In this way, for a determined average blade pitch angle calculated in a time window, no blade pitch excursions beneath a certain blade pitch value are permitted.

There are cases in which the blade pitch angle lower limit value (instead of being predetermined for each average wind speed or power or average blade pitch) is varied taking into account the modification in the aerodynamic efficiency of the blade due, for example, to the deposition of ice or dirt on it. Examples of these control techniques can be found in the following patent documents:

Hence patent document U.S. Pat. No. 8,096,761 describes a control method which, in the presence of ice, modifies the value of the blade pitch angle lower limit β min. This patent does not specify how the presence of ice is identified, and mentions only an estimation of the loss of aerodynamic efficiency. Meanwhile U.S. Pat. No. 4,656,362 presents a control method which modifies the value of the blade pitch angle lower limit β min using a value related to aerodynamic performance.

At present individual blade pitch control techniques use sensors to measure the loads on the blades, on the basis of which the loads on the fixed axis are estimated.

DESCRIPTION OF THE INVENTION

In a first aspect, the present invention relates to a control method for wind turbines that are in circumstances such as those described above. More specifically, the control method described herein becomes especially useful when it is determined that there is a misalignment of the wind turbine with respect to incident wind, which can cause non-optimal functioning in terms of energy capture as well as causes anomalies in the wind turbine and its components. A second aspect of the present invention relates to a wind turbine blade pitch control system adapted to carry out the method related to the first aspect of the present invention.

Consequently and in a preferred embodiment of the wind turbine control method with blade pitch control system, action is carried out on the different control systems thereof when it is determined that there is a misalignment of the nacelle with respect to the direction of incident wind; to be able to carry out the following steps of the preferred embodiment of the method described herein it allows the value of the blade pitch angle $\beta$ to be adapted on the basis of the value of the wind turbine misalignment $\varphi$, this value of the blade pitch angle $\beta$ allows, by means of a set point sent to the blade actuators, a reduction in the loads associated for example, to an excessive turbulence of the wind direction (there are gust effects of wind direction which are harmful).

The control method of the present invention, carries out a series of data gathering and on the basis thereof proceeds to carry out a calculation of the lower limit of the blade pitch angle $\beta_{MIN}$ on the basis of the value of the wind turbine misalignment $\varphi$. To do this, the control method proceeds to obtain the value of at least one indicative signal of the wind speed incident on the wind turbine or of an average of same, for example, a signal related to the average angle of the blade pitch angle and a value indicative of the misalignment of the wind turbine $\varphi$.

To obtain a value of the lower limit of the blade pitch angle $\beta_{MIN}$ on the basis of said value indicative of the misalignment of the wind turbine $\varphi$, initially use is made of some calculations that allow a correlation to be obtained which defines the blade pitch angle lower limit value $\beta_{MIN}$ which marks a stalling threshold for each value of the indicative signal of wind speed. Said correlation is modelled in the form of a table and is implemented in the control system of the wind turbine in order to have the correlation between the lower limit of the blade pitch angle $\beta_{MIN}$ which marks a stalling threshold and each value of the signal indicative of wind speed $\lambda$. This makes it possible to obtain for each value of the signal indicative of wind speed A the lower limit value of the blade pitch angle $\beta_{MIN}$ to avoid operation in the zone of aerodynamic stalling.

Additionally, the method described herein presents an additional term $-\Delta\beta_{MIN}$ to the lower limit value of the blade pitch angle $\beta_{MIN}$ obtained on the basis of the comparison of the signal indicative of wind speed with a curve or table comprising a correlation that defines the blade pitch angle lower limit value $\beta_{MIN}$ which marks a stalling threshold for each value of the signal indicative of wind speed. The addition of the aforesaid additional term $-\Delta\beta_{MIN}$ is cancelled in the event that it is determined that the wind direction is maintained, after a time has passed since there has been a rapid variation in the value indicative of misalignment as a consequence of a rapid change in wind direction.

Alternatively, different time constants are applied in a filter for the estimation of a filtered value of the blade tip speed ratio $\lambda$, used as a signal indicative of wind speed for obtaining the lower limit of the blade pitch angle $\beta_{MIN}$.

EXAMPLE OF A PREFERRED EMBODIMENT OF THE INVENTION

Figure 1:
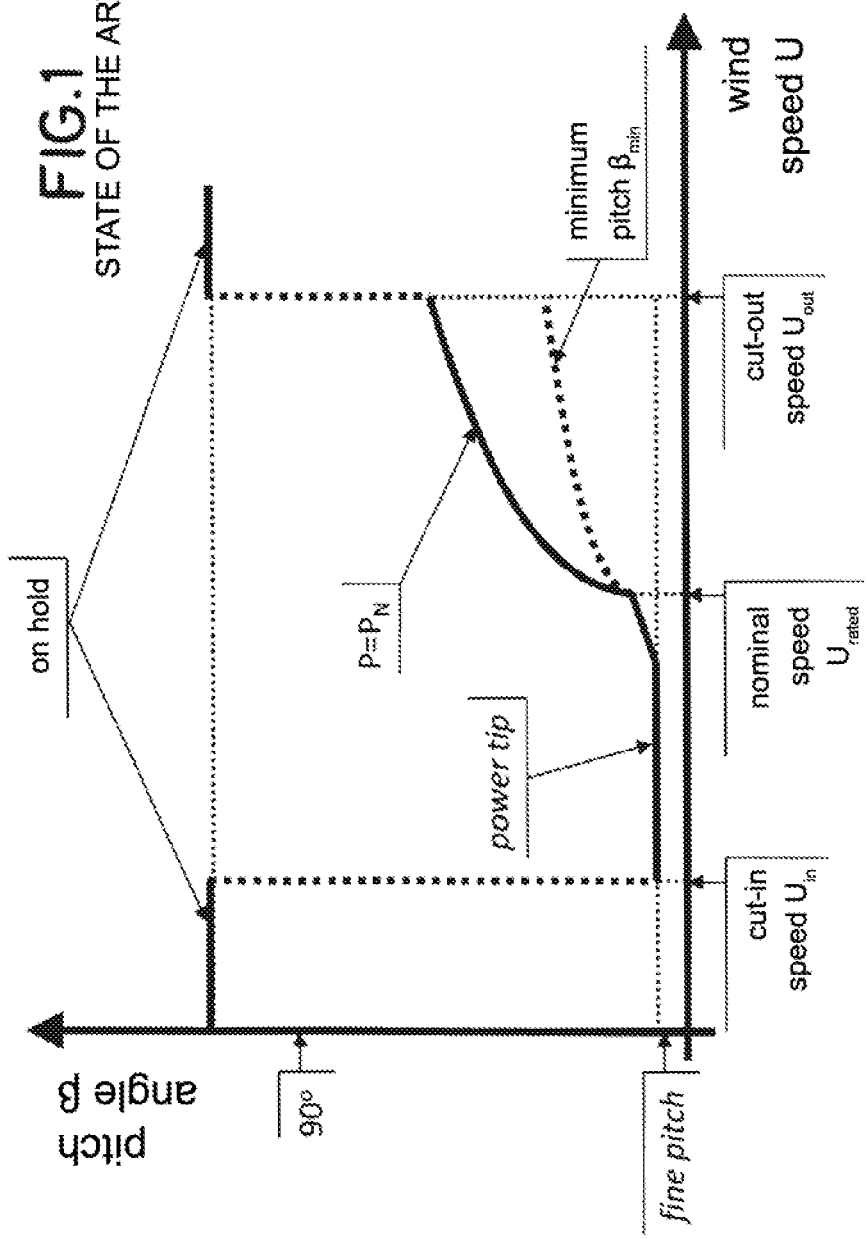
FIG. 1 shows a graph which details the state of the art: illustrating a curve of minimum blade pitch angle as a function of wind speed. It can be seen how below the rated wind speed there is a zone of partial load, whereas above the nominal power rated wind speed there is a zone of rotational speed regulation with the blade pitch angle.
Figure 2:
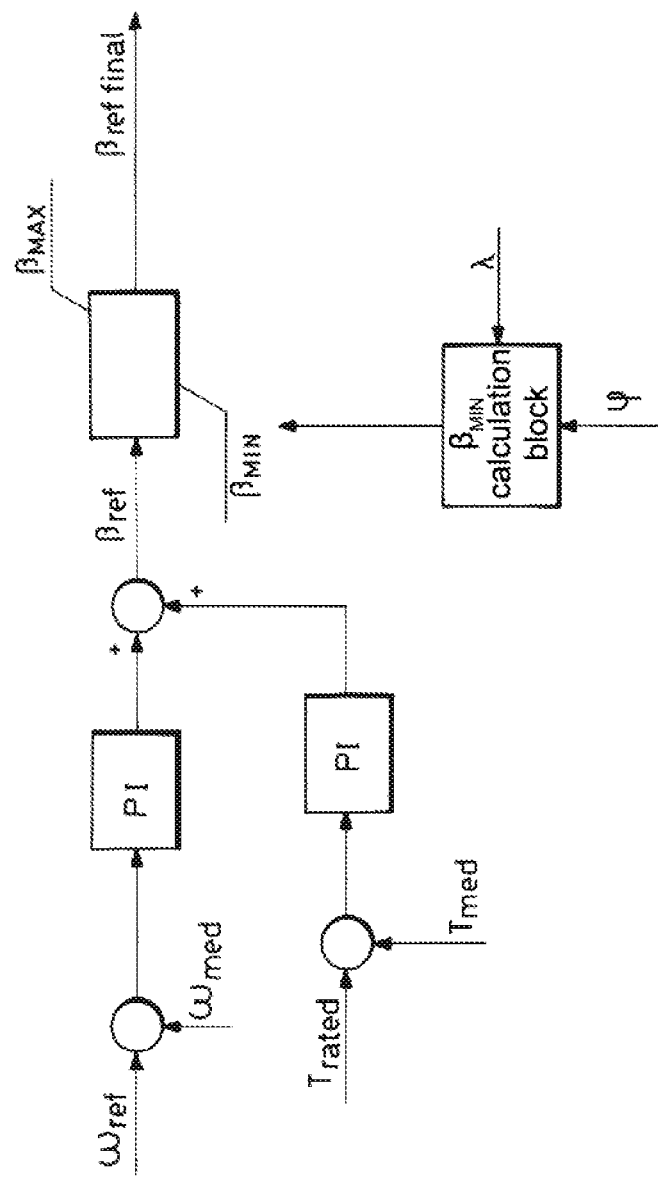
FIG. 2 shows a block diagram of the control system which allows the method of the invention to be implemented.

The wind turbine for which the control method of the invention is intended comprises a series of blades, and control system of blade pitch angle $\beta$ such as the one observed in FIG. 2. Said blade pitch control system makes it possible to implement the control method of the invention, wherein based on a wind turbine misalignment value $\varphi$ with respect to a direction of incident wind, a lower limit value of the blade pitch angle $\beta_{MIN}$ is calculated in a calculation block of the lower limit of the blade pitch angle $\beta_{MIN}$. In the light of said FIG. 2 it can be appreciated that an initial blade pitch angle set point $\beta_{ref}$ can be calculated as the sum of the contributions of the two PI-type regulators, one using as input signal the error in the speed of rotation of the rotor $(\omega_{ref}-\omega_{med})$ and the other using as input signal the difference between the rated torque and the torque calculated in the regulator of the speed of rotation using torque $(T_{rated}-T_{med})$. The initial blade pitch angle set point $\beta_{ref}$ is restricted at top and bottom between upper and lower blade pitch angle limits $(\beta_{MAX}, \beta_{MIN})$ to obtain a final blade pitch angle final set point $\beta_{ref\_final}$ which will be sent to the blade pitch actuators. To calculate the value of the lower limit of the blade pitch angle $\beta_{MIN}$, the control system uses as information at least one value indicative of the wind turbine's misalignment $\varphi$.

In this way, and making use of the control system mentioned above or of a similar one, one proceeds to calculate:

A value indicative of the wind turbine's misalignment $\varphi$ based on at least one signal indicative of the wind's direction.

An initial set point of blade pitch angle β based on at least one value related to an error in the speed of rotation of the rotor ($\omega_{ref} - \omega_{med}$).

To subsequently proceed to modify at least one initial set point of blade pitch angle if the latter is lower than the lower limit value of the blade pitch angle $\beta_{MIN}$, calculated on the basis of the value indicative of misalignment φ, in such a way that a blade pitch final set point is greater than or equal to the lower limit value of the blade pitch angle $\beta_{MIN}$ to subsequently act on at least one of the blades of the wind turbine based on the blade pitch angle final set point value.

Furthermore, the control method comprises calculating the value of the lower limit of the blade pitch angle $\beta_{MIN}$ using the value indicative of misalignment φ.

In this way, the value of the lower limit of the blade pitch angle $\beta_{MIN}$ is adapted to the conditions of wind turbine orientation, to prevent excessive stalling and/or loads.

To be able to calculate the value of the lower limit of the blade pitch angle $\beta_{MIN}$ one proceeds to make a comparison of a signal indicative of wind speed with a curve or table comprising a correlation between the blade pitch angle lower limit value $\beta_{MIN}$ and the signal indicative of wind speed which defines the blade pitch angle lower limit value $\beta_{MIN}$ which determines an aerodynamic stalling threshold for each value of the signal indicative of wind speed. The data that gives rise to the table or curve can be obtained by means of simulation of the points related to the power coefficient Cp for each blade pitch angle β at different blade tip speeds.

In one possible embodiment a blade tip speed ratio λ is used as a signal indicative of wind, although in other possible embodiments the signal indicative of wind speed can be taken on the basis of instantaneous wind speed data, average wind speed or on the basis of data related to the average power or average blade pitch angle. However, the use of the blade tip speed ratio λ makes it possible to take into account not only the effects of wind speed on the rotor, but also the effects of the rotation of the rotor itself, as the influence of the speed of rotation of the rotor on the profile lift force (measured through the power coefficient Cp) is substantial. The blade tip speed ratio λ is determined on the basis of wind speed measurements—which can be taken by means of wind data capture means such as anemometers—and speed of rotation of the rotor and is calculated by means of the following formula, as the quotient between linear speed of the blade tip and wind speed, according to the formula:

$$\lambda = \frac{\text{blade tip linear speed}}{\text{wind speed}}$$

Figure 3:
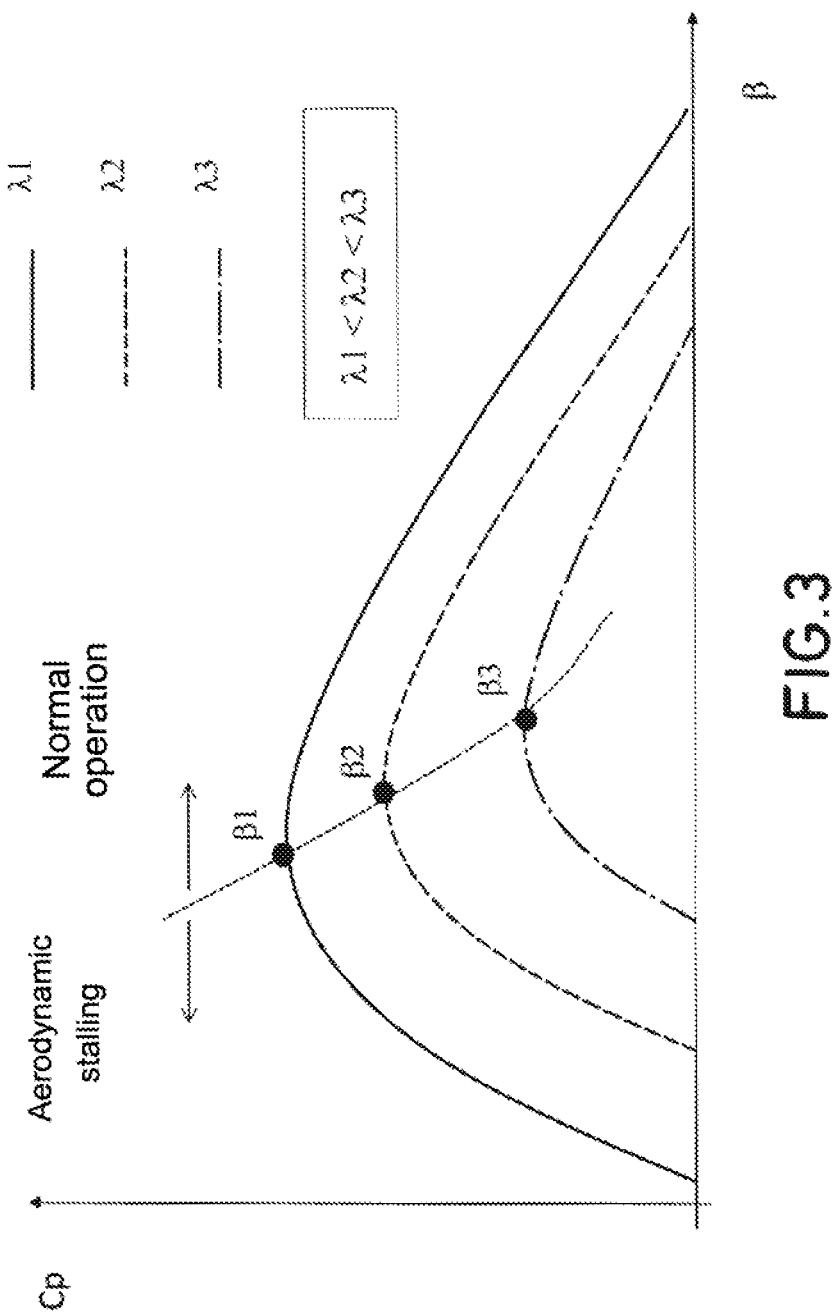
FIG. 3 shows a graph of the curves Power coefficient Cp-blade pitch angle $\beta$; for different blade tip speed ratios $\lambda$.

FIG. 3 shows curves which illustrate the relationship between the power coefficient Cp and the blade pitch angle β for different values of blade tip speed ratio λ. It can also be appreciated how said curves have respective maximum values which mark a transition between two zones of operation:

A first zone or zone of normal operation, for which control of the wind turbine is tuned.

A second zone or zone of aerodynamic stalling for which control of the wind turbine is not valid. It is for this reason that the control of the wind turbine incorporates the lower limit value of the blade pitch angle $\beta_{MIN}$ to avoid the operation in the zone of aerodynamic stalling.

Hence, the calculation of the initial set point of the blade pitch angle β is based on the error of the speed of rotation of the rotor.

Said curves do not take into account lift losses associated to a potential deposition of particles on the surface of the blade which alter the geometry of the aerodynamic profiles nor other effects which vary the lift of the blades, such as misalignment and its corresponding value φ.

Figure 4:
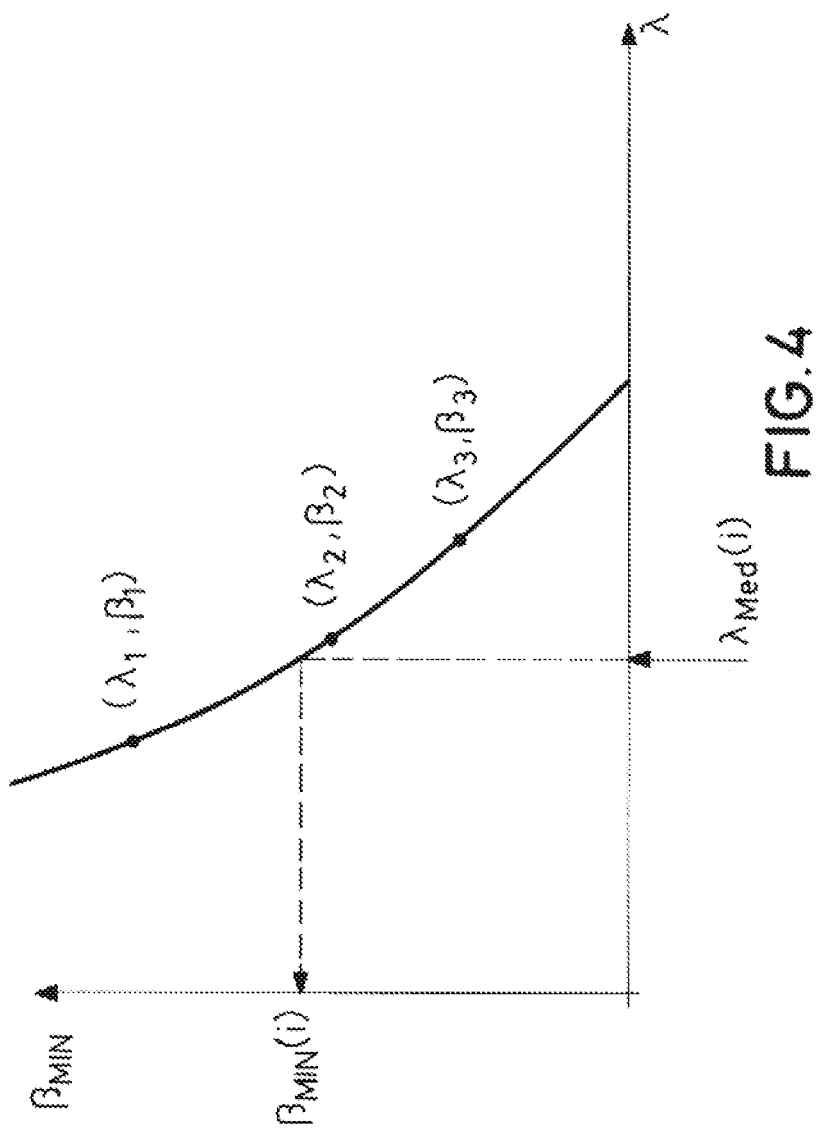
FIG. 4 shows a graph in which a curve $(\beta_{MIN}-\lambda)$ can be appreciated which defines the blade pitch angle lower limit value $\beta_{MIN}$ which marks the stalling threshold for each value of blade tip speed ratio $\lambda$.

The maximum points of the curves which relate the power coefficient [Cp] with the blade pitch angle β for different values of the blade tip speed ratio λ define pairs of points β–λ which are used to characterise a curve ($\beta_{MIN}$–λ), which can be appreciated in FIG. 4, which in turn defines the blade pitch angle lower limit value $\beta_{MIN}$ which marks a stalling threshold value for each value of blade tip speed ratio λ. Said curve is modelled in one embodiment in the form of the aforementioned table and is implemented in the control system of the wind turbine to characterise the correlation between the blade pitch angle lower limit value $\beta_{MIN}$ which marks a stalling threshold and each value of the signal indicative of wind speed λ. This makes it possible to obtain for each value of the blade tip speed ratio λ the lower limit value of the blade pitch angle $\beta_{MIN}$ to avoid operation in the zone of aerodynamic stalling. In the hypothetical lambda value in instant i ($\lambda_{Med}(i)$), the corresponding lower limit value of the blade pitch angle ($\beta_{MIN}(i)$) is obtained as can be appreciated on viewing FIG. 4.

As the table implemented in the wind turbine control system comprises a limited number of pairs of points, for those measurements of blade tip speed ratio values λ which do not correspond to any of the points on the table, a process of interpolation is carried out between at least two of them using conventional interpolation techniques, such as for example a linear interpolation.

Given that the signals related to the measurements of wind speed and speed of rotation of the rotor necessary for obtaining the blade tip speed ratio λ can have noise and produce undesirable effects such as fluctuations; the method described herein envisages applying at least one filter F1 to any signal which requires it, as in this case to the signals related to the blade tip speed ratio λ so as to therefore carry out a filtration process and smooth said signal in time and for said fluctuations in the measurements not to be reflected in the lower limit value of the blade pitch angle $\beta_{MIN}$.

Said filters may be of any type that allows the required result to be obtained, such as a low pass filter which allows the lower frequencies to pass and attenuates those higher frequencies and which moreover presents a configurable time constant, or a filter based on a moving average which can be calculated with a configurable number of points.

Figure 6:
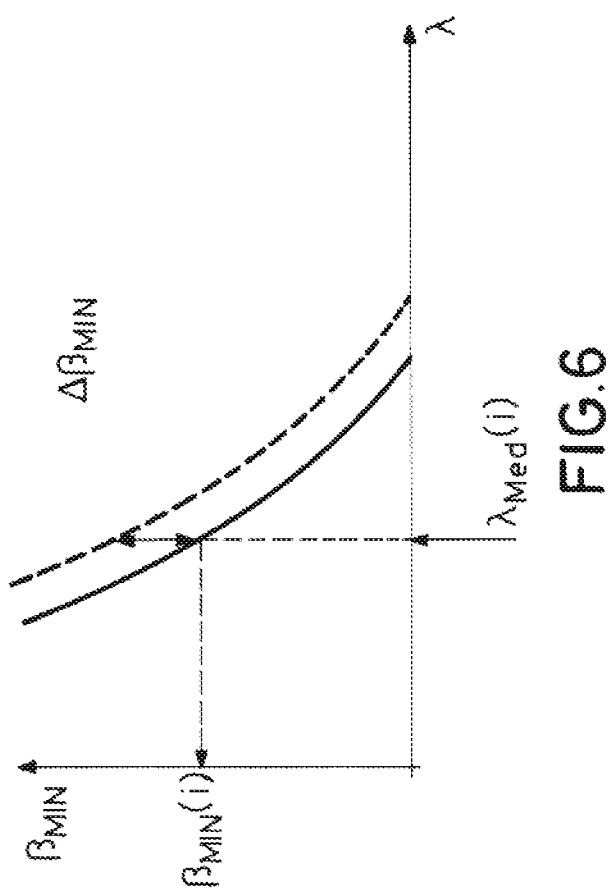
FIG. 6 shows a graph in which the resulting $\beta_{MIN}$ can be appreciated in an embodiment which comprises adding an additional value $\Delta\beta_{MIN}$ to the minimum limit defined by the curve that marks the stalling blade pitch angle $\beta_{MIN}$ (i) for each $\lambda$.
Figure 7:
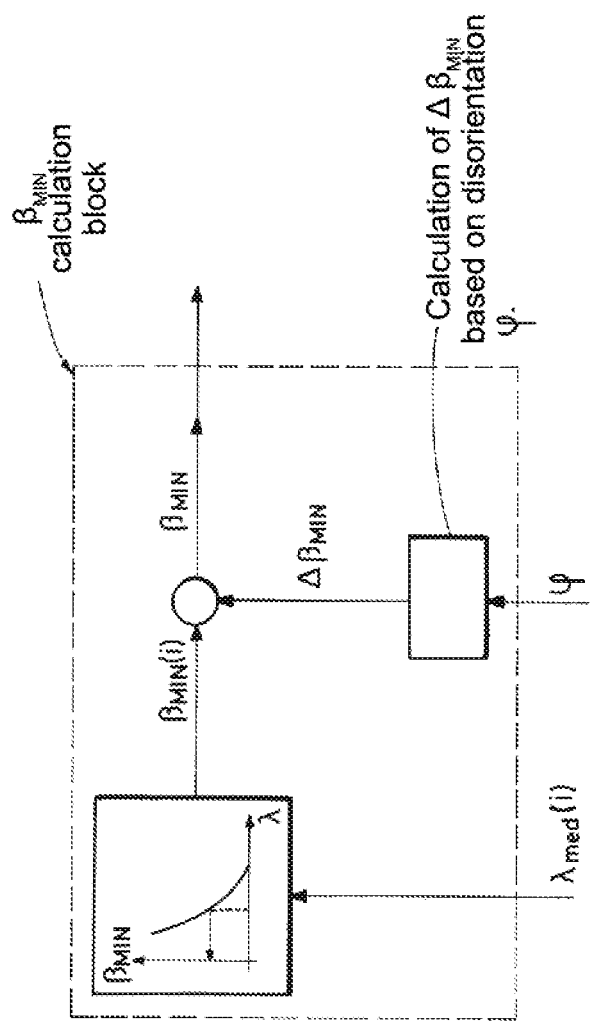
FIG. 7 shows a diagram in which a detail can be appreciated of the calculation block of the minimum limit of blade pitch angle based on misalignment according to a preferred embodiment. In this case, an additional term $\Delta\beta_{MIN}$ is added to the minimum limit $\beta_{MIN}$ (i) defined by the curve that marks the stalling blade pitch angle for each $\lambda$.

In one preferred embodiment, the method comprises adding an additional term of the blade pitch angle lower limit value $\Delta\beta_{MIN}$ (which can be predetermined or dependent on the misalignment value φ) to the lower limit value of the blade pitch angle $\beta_{MIN}$ obtained from comparing the signal indicative of the blade tip speed ratio λ with the predetermined curve or table which defines the blade pitch angle lower limit value $\beta_{MIN}$ at which the blade does not stall, as illustrated in FIGS. 6 and 7. In this way, when there is misalignment, the minimum limit value of the blade pitch angle $\beta_{MIN}$ is greater than when it does not exist, allowing a higher limit to be used to avoid the blade evolving towards a blade pitch angle β lower than that which the wind speed requires (note that due to the misalignment, the wind component perpendicular to the plane of the rotor is less than when the wind turbine is aligned, meaning that the blade pitch angle β tends to diminish to maintain the speed of rotation; however, the blade pitch angle β in those circumstances is less than that corresponding to the same speed of rotation with the wind turbine correctly aligned). This is particularly advantageous in the nominal production zone, which is to say, the zone in which there is regulation of the speed of rotation of the rotor using the blade pitch angle β.

Figure 8:
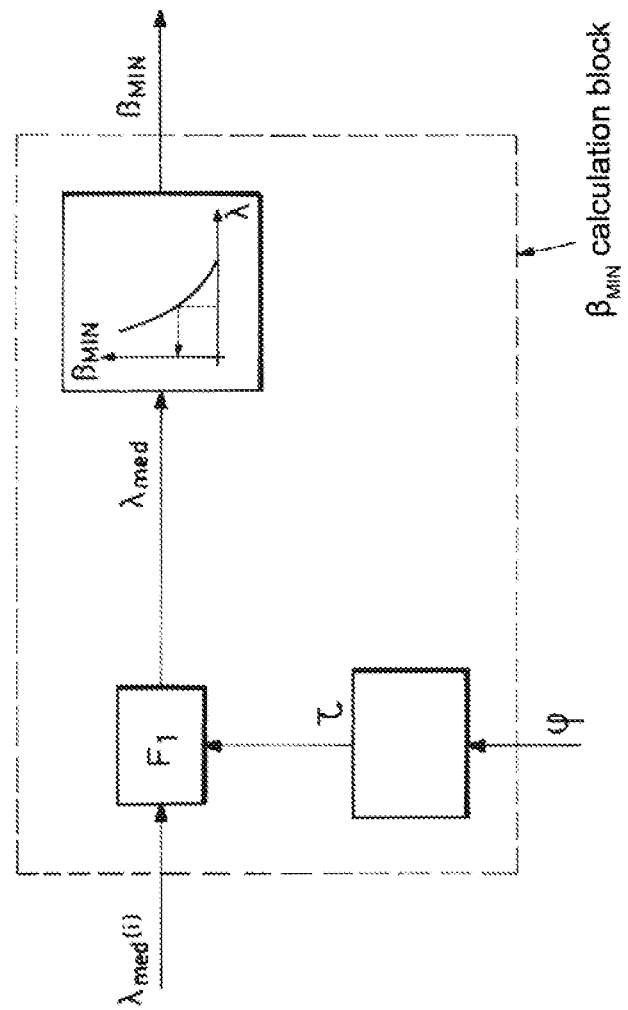
FIG. 8 shows a diagram of a detail of the calculation block of the lower limit value of the blade pitch angle $\beta_{MIN}$ based on misalignment according to an alternative embodiment, wherein based on misalignment the filtration time constant $\tau$ of the filter F1 applied to the measurement of the blade tip speed ratio $\lambda$ is modified which allows a filtered signal $\lambda_{med}$ to be obtained for being used to obtain the $\beta_{MIN}$ defined by the curve which marks the stalling blade pitch angle $\beta$ for each value of blade tip speed ratio $\lambda$.

According to an embodiment such as the one shown in FIG. 8; the method comprises modifying a filtration time constant τ when there is misalignment. Hence, in one embodiment, the filtration time constant τ when there is misalignment $\tau\_{Misaligned}$ used in the filter F1 to calculate the filtered value of the blade tip speed ratio λ, $\lambda_{med}$, is different to the filtration time constant when there is no misalignment $\tau\_{Aligned}$. Specifically, in a preferential manner the value of the filtration time constant when there is a significant misalignment $\tau\_{Misaligned}$ is greater than the filtration time constant when there is none $\tau\_{Aligned}$, in other words ($\tau\_{Misaligned} > \tau\_{Aligned}$). This has, as a technical effect, having a slower variation of the filtered λ signal, $\lambda_{med}$, for the same input signal when there is misalignment than when there is not, therefore, a slower temporal evolution of the lower limit value of the blade pitch angle $\beta_{MIN}$ in said circumstances. This is especially advantageous in the zone of operation at partial load, which is to say, the zone in which the speed of rotation of the rotor is regulated with the electrical torque of the generator. In this case, when the wind turbine is in the zone of torque regulation of the speed of rotation the blade pitch angle β is that of greatest production (or greatest lift coefficient). In this case, if there is a sudden gust of wind, the lower limit value of the blade pitch angle $\beta_{MIN}$ will increase its value as the wind speed increases (or the blade tip speed ratio λ) at a speed dependent on a first filtration constant faster than the blade pitch angle set point does to control the speed of rotation of the rotor for the speed error. This has as effect that, because the initial blade pitch β set point is lower than the lower limit value of the blade pitch angle $\beta_{MIN}$, the final set point takes the lower limit value of the blade pitch angle $\beta_{MIN}$. However, if at that moment a change in orientation occurs, it is advisable to reduce extreme loads, to reduce the speed of actuation of the blade pitch system for which it is proposed to reduce the time constant applied for calculation of the blade tip speed ratio λ.

Also, in one possible embodiment, it is possible to modify the calculation of the lower limit value of the blade pitch angle $\beta_{MIN}$ only if it is determined that the misalignment value φ is above a predefined misalignment threshold value, by means of a comparison of the misalignment value φ of the wind turbine with the threshold.

Thus, for example, in one possible embodiment in which it is determined or known that there is no misalignment or that the misalignment is below the predefined threshold value, the calculation of the lower limit value of the blade pitch angle βMIN is carried out on the basis of a signal indicative of wind speed, preferably the blade tip speed ratio λ, and a predetermined curve which defines the blade pitch angle lower limit value βMIN which marks the stalling threshold for each value of blade tip speed ratio λ, without carrying out the sum of any additional term or modification of the filtration time constant τ. However, when the misalignment is significant, the lift losses or variation in actual Cp is relevant and it is advisable to protect against new changes in wind direction; meaning that if it is determined that the misalignment exceeds the misalignment threshold value then said calculation of the lower limit value of the blade pitch angle $\beta_{MIN}$ is modified, either by means of the sum of an additional term of the blade pitch angle lower limit value $\Delta\beta_{MIN}$ (which can be predetermined or dependent on the misalignment value) or by means of modifying the filtration time constant τ in the filter F1.

Figure 5:
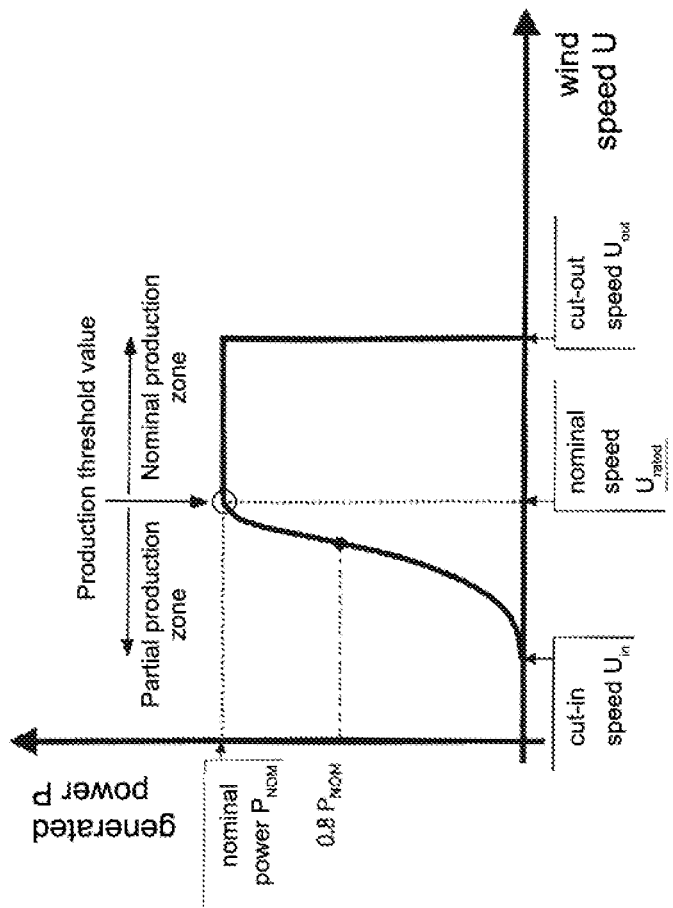
FIG. 5 shows a graph in which a power curve as a function of wind speed can be appreciated (below rated wind speed: partial production zone, above rated wind: zone of nominal production or of speed of rotation regulation with the blade pitch angle).

When the wind turbine is operating in the nominal production zone according to FIG. 5, the blade pitch control system is regulating the speed of rotation of the rotor an the wind turbine will be operating with positive blade pitch angles.

In one embodiment, when the wind turbine is operating in said zone, if the misalignment value of the wind turbine exceeds the predefined threshold value, the lower limit value of the blade pitch angle $\beta_{MIN}$ is calculated by means of adding a predetermined value $\Delta\beta_{MIN}$ to the lower limit value of the blade pitch angle $\beta_{MIN}$ initially obtained from comparing the signal indicative of wind speed with the predetermined curve or table which defines the blade pitch angle lower limit value $\beta_{MIN}$ at which the blade does not stall for each value of the signal indicative of wind speed, as can be appreciated from FIG. 7. In this way, when the wind turbine is operating in the zone of speed regulation with blade pitch, if there is a sudden misalignment due to a change in wind direction, the blade pitch angle β is prevented from declining below a value greater than the stall minimum limit, as illustrated in FIG. 6. In this production zone, it is advisable to use a lower limit value of the blade pitch angle $\beta_{MIN}$ above the limit value that marks stalling as, if the wind direction changes again and becomes similar to the previous direction, and the blade pitch angle β has already declined as a consequence of the reduction in aerodynamic torque caused by the transient misalignment of the wind turbine, the blade is in a zone in which it will suffer a higher load. Therefore, it is advisable to avoid load excesses and in the manner described a reduction in fatigue loads is achieved in situations of winds with frequent changes in direction within short time intervals.

Also, the greater the error in alignment, the more protected it is advisable for the wind turbine to be against new changes in direction and gusts of wind, so that in one embodiment, the added value is growing with the alignment error from a minimum threshold error.

Said additional minimum limit value $\Delta\beta_{MIN}$ is obtained by means of the calculation block of the control system which allows calculation, among other things, of the lower limit value of the blade pitch angle $\beta_{MIN}$ on the basis of the misalignment as shown in FIG. 7. As explained, there are different scenarios for the calculation of the additional term $\Delta\beta_{MIN}$:

Comparison of the misalignment value with the predefined misalignment threshold value in such a way that if it exceeds or is equal to it, $\Delta\beta_{MIN}$ adopts a positive predetermined value and if it does not exceed it, $\Delta\beta_{MIN}$ is equal to zero.

Assignation of a $\Delta\beta_{MIN}$ value for each misalignment value on the basis of a table or function.

A combination of the two, comparison of the misalignment value with the predefined misalignment threshold value and assignation of a $\Delta\beta_{MIN}$ for each misalignment value on the basis of a table or function when the misalignment value exceeds the threshold value and when it does not exceed it $\Delta\beta_{MIN}$ is equal to zero.

If the wind direction is maintained after a predefined time interval ΔT since a sudden change in wind direction (which can be determined by means of the comparison of the rate of change of misalignment with respect to time), the lower limit value of the blade pitch angle $\beta_{MIN}$ is calculated again only on the basis of the comparison of a signal indicative of wind speed with a predetermined curve or table which defines the blade pitch angle lower limit value $\beta_{MIN}$ that marks a stalling threshold for each value of the signal indicative of wind speed. Which is to say, after a ΔT since a sudden change in wind direction, $\Delta\beta_{MIN}$ is cancelled or τ regains its original value. This is so because, if the wind orientation direction is maintained for a while, it is not advisable to maintain a lower limit value of the blade pitch angle $\beta_{MIN}$ that is too high, as it might not be appropriate for the speed of the incident wind. This is a transient protection measure for the machine, until it is determined that the wind turbine is in a stable situation.

The invention claimed is:

1. A control method of a wind turbine which comprises a series of blades, and a blade pitch angle control system, the method comprising the following steps:
  calculating a value indicative of a misalignment φ of the wind turbine on a basis of at least one signal indicative of wind direction,
  determining whether the value indicative of the misalignment φ of the wind turbine is above a first predefined misalignment threshold value;
  adapting a value of a blade pitch angle β, wherein the step of adapting the value of the blade pitch angle β further comprises:
    adapting the value of the blade pitch angle β at least on a basis of the value indicative of the misalignment φ of the wind turbine if the value indicative of the misalignment φ of the wind turbine is determined to be above the first predefined misalignment threshold value; and
    adapting the value of the blade pitch angle β without the value indicative of the misalignment φ of the wind turbine if the value indicative of the misalignment φ of the wind turbine is determined not to be above the first predefined misalignment threshold value, and
  rotating at least one of the blades of the wind turbine about its longitudinal axis on a basis of the adapted value of the blade pitch angle β.

2. The control method according to claim 1 wherein the step of adapting the value of the blade pitch angle β at least on the basis of the value of the misalignment φ further comprises:
  calculating an initial set point of the blade pitch angle β,
  modifying the initial set point of the blade pitch angle β if the initial set point of the blade pitch angle β is less than a minimum blade pitch angle $\beta_{MIN}$ so that a blade pitch angle final set point is greater than or equal to the minimum blade pitch angle $\beta_{MIN}$; and
  rotating at least one of the blades of the wind turbine about its longitudinal axis on the basis of the blade pitch angle final set point value;
  wherein the minimum blade pitch angle $\beta_{MIN}$ is calculated on the basis of at least the value indicative of the misalignment φ.

3. The control method according to claim 2, wherein the calculation of the minimum blade pitch angle $\beta_{MIN}$ comprises carrying out a comparison of a signal indicative of wind speed with a curve or table comprising a correlation between the minimum blade pitch angle $\beta_{MIN}$, which defines a stalling threshold, and each value of the signal indicative of wind speed.

4. The control method according to claim 3, wherein the signal indicative of wind speed comprises a blade tip speed ratio λ, defined as a quotient between a linear speed of the blade tip and the wind speed:

$$\lambda = \frac{\text{blade tip linear speed}}{\text{wind speed}}$$

5. The control method according to claim 4, wherein the signal indicative of wind speed is a filtered measurement of the blade tip speed ratio λ obtained by means of applying a filter F1 to the blade tip speed ratio λ.

6. The control method according to claim 5 wherein the filter F1 comprises a time constant τ which is configurable.

7. The control method according to claim 6 wherein the filter F1 is a moving mean.

8. The control method according to claim 7 further comprising calculating the moving mean with a configurable number of used points.

9. The control method according to claim 5 wherein the step of calculating the minimum blade pitch angle $\beta_{MIN}$ comprises a modification of a filtration time constant τ for the filter F1 applied to the blade tip speed ratio λ.

10. The control method according to claim 9 further comprising comparing the value indicative of the misalignment φ with the first predefined misalignment threshold value and in that the modification of the filtration time constant τ for the filter F1 is related to the value indicative of the misalignment φ; in such a way that the filtration time constant τ for the filter F1 is greater when the value indicative of the misalignment φ is greater than the first predefined misalignment threshold value and lower when the value indicative of the misalignment φ is lower than the first predefined misalignment threshold value.

11. The control method according to claim 9 wherein the modification of the filtration time constant τ for the filter F1 applied to the blade tip speed ratio λ is carried out in a zone of partial production.

12. The control method according to claim 9 wherein if after a predefined time interval ΔT from a change in misalignment triggered when a rate of change of misalignment with respect to time is above a second predefined misalignment threshold value the wind speed is maintained, then the filtration time constant τ of the filter F1 regains its original value τ.

13. The control method according to claim 3, wherein the calculation of the minimum blade pitch angle $\beta_{MIN}$ comprises a step of adding an additional term $\Delta\beta_{MIN}$ to the minimum blade pitch angle $\beta_{MIN}$ obtained through comparing the signal indicative of wind speed with the curve or table comprising the correlation between the minimum blade pitch angle $\beta_{MIN}$, which marks a stalling threshold for each value of the signal indicative of wind speed, when an existence of misalignment is determined on the basis of the value indicative of the misalignment φ.

14. The control method according to claim 13 wherein the additional term $\Delta\beta_{MIN}$ is predetermined or dependent on the value indicative of the misalignment φ.

15. The control method according to claim 13 wherein if after a predefined time interval ΔT from a change in misalignment triggered when a rate of change of misalignment with respect to time is above a second predefined misalignment threshold value the wind direction is maintained, then the additional term $\Delta\beta_{MIN}$ is canceled.

16. The control method according to claim 2 wherein the step of calculating the initial set point of the blade pitch angle β is performed on the basis of at least one value related to an error in a speed of rotation of a rotor of the wind turbine.

17. A control method of a wind turbine which comprises a series of blades, and a blade pitch angle control system, the method comprising the following steps:

calculating a value indicative of a misalignment $\varphi$ of the wind turbine on a basis of at least one signal indicative of wind direction, determining whether the value indicative of the misalignment $\varphi$ of the wind turbine is above a first predefined misalignment threshold value;

if the value indicative of the misalignment $\varphi$ of the wind turbine is determined to be above the first predefined misalignment threshold value, adapting a value of a blade pitch angle $\beta$ at least on a basis of the value indicative of the misalignment $\varphi$ of the wind turbine; and if the value indicative of the misalignment $\varphi$ of the wind turbine is determined not to be above the first predefined misalignment threshold value, the value of the blade pitch angle $\beta$ is not adapted; and rotating at least one of the blades of the wind turbine about its longitudinal axis on the basis of the value of the blade pitch angle $\beta$.

* * * * *